Jan. 18, 1955 M. E. EVANS 2,700,065

TELEVISION RECEIVING APPARATUS

Filed Sept. 15, 1950

INVENTOR.

BY Martin E. Evans

United States Patent Office 2,700,065
Patented Jan. 18, 1955

2,700,065

TELEVISION RECEIVING APPARATUS

Martin E. Evans, Brooklyn, N. Y.

Application September 15, 1950, Serial No. 184,990

12 Claims. (Cl. 178—5.8)

This invention relates to television apparatus and more particularly to key controlled television receivers in public places.

In public eating or refreshment places television reception as now presented is a group affair by reason of the nature of the display of the visual program and of the propagation and dissemination of the accompanying sound effects. The display screen is positioned where all eyes may view it. The sound accompanying the changing display is propagated so that all ears may hear it.

In contrast to this practice, it is an object of this invention to provide in public places means for television display and sound propagation accommodating individual reception by members of these groups. Another object is to provide means to collect a fee for this service. A further object is to provide means for reception of various programs simultaneously for individuals in a group.

Other objects will become evident from the accompanying specification and drawings in which.

Figures 1, 2, 3:
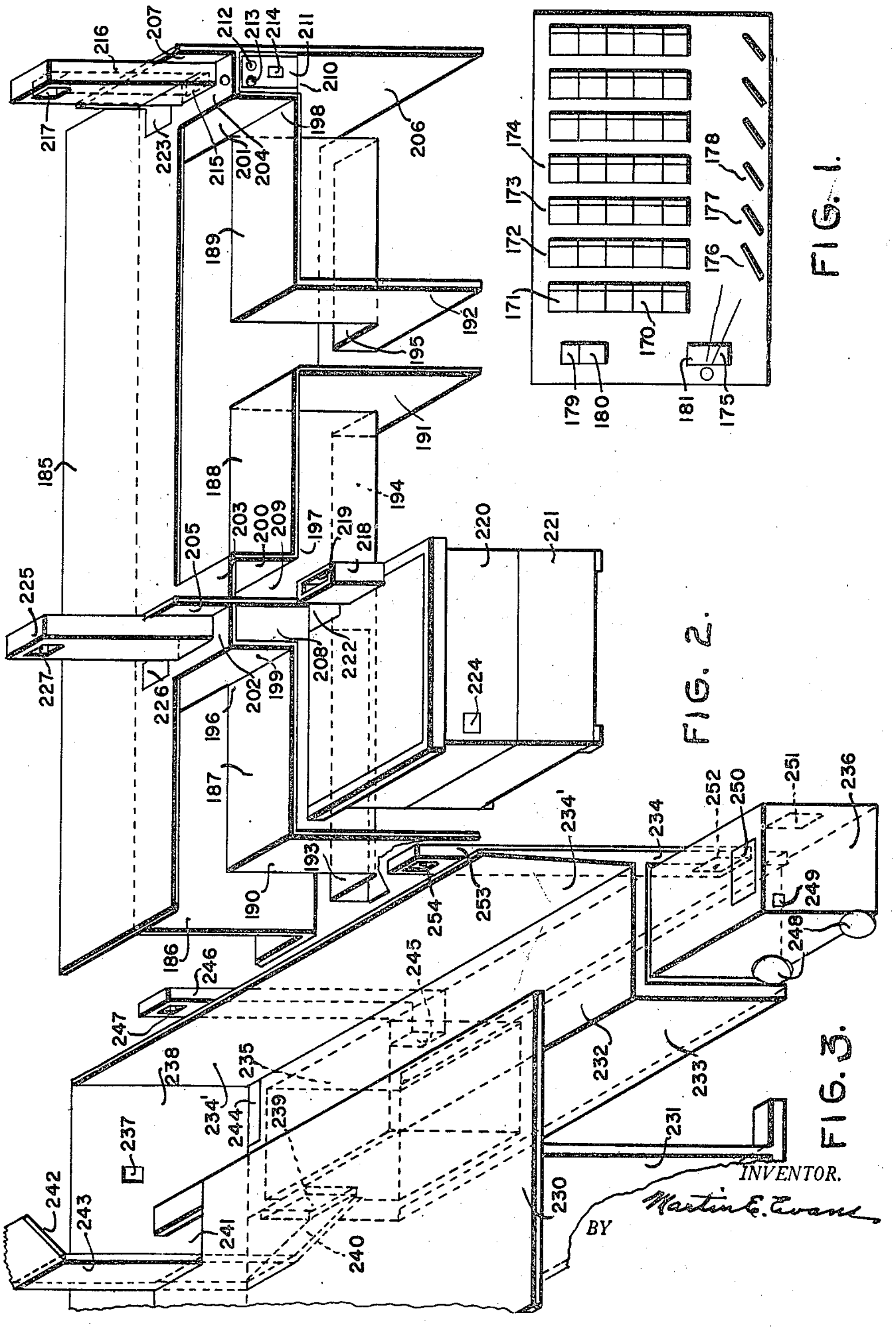
Fig. 1 is a plan view of a group layout showing seating arrangements for individual television reception.
Fig. 2 is a view in perspective of a display for television reception at a counter.
Fig. 3 is a view in perspective of a display for television reception in a booth.

Referring to Fig. 1, a plurality of benches 171, 172, 173, 174 are arranged in group formation having individual seats 170. These seats are of a character adapted to accommodate a small portable television receiver and display television images and direct accompanying sound only to the individual occupying the seat. Service to the group is provided from points 175, 181, 180 and 179. Entrance to the room is through doors 176, 177, 178.

Referring to Figs. 2 and 3 the invention is shown providing an atmosphere of entertainment in a restaurant where Fig. 1 is a lunch counter arrangement and Fig. 2 is a contiguous booth arrangement.

In Fig. 2 a counter 185 has a support 186. Before it are seats 187, 188, 189 with floor supports 190, 191, 192, and with suspension supports 199, 200, 201. Foot rests 193, 194, 195 are partially outlined. Top pieces 202, 203, and 204 are lateral extensions of the counter 185. The top pieces 202 and 203 are separated by an upstanding support 205 extending from the floor and at a distance above to provide a partition between members 202 and 203. Similarly, top piece 204 is supported by member 206 upstanding from the floor to provide end member 207. The upstanding members 199, 200 and 201 with top pieces 202, 203 and 204, and upstanding members 205 and 206 are selectively joined to form rectangular chambers 208, 209, 210 open on the bottom sides.

In the trough 210 is shown a radio receiver 211 with operating controls 212 and 213 and with coin control 214. Adjacent the loudspeaker of the receiver 211 is an opening 215 in top 204 giving access to an air column in upstanding tube 216 supported on the top 204 by upstanding member 207. The tube 216 has a horizontal passage 217 at a height suitable to emit sound adjacent an ear of a person on seat 189. Receiver 211 may be self contained or it may be connected to a source of electricity not shown. It is removably held in its position by means not shown so that the passage 210 may be entered by an upstanding tube 218 with opening 219 on portable television receiver 220 on stand 221. The opening 219 of receiver 220 cooperates with the opening 215 and tube 216 where the stand 221 and receiver 220 are positioned under the seat 189. Also video viewing area 222 of receiver 220 cooperates with display 223 in table top 185 to reveal the changing scenes of the video receiver 220 to an occupant of seat 189. The receiver 220 has a coin control 224, the operating controls therefor not being shown. As shown in Fig. 2 the video receiver 220 is in position to be moved under seat 187. When so moved the upstanding tube of the receiver cooperates with upstanding tube 225 and video viewing area 222 cooperates with display screen 226 in table top 185 to show images to a person on seat 187. The tube 225 has a horizontal passage 227 at a height suitable to emit sound adjacent an ear of a person on seat 187. Suitable power connections not shown are available for the operation of the receiver 220.

In Fig. 3, a table top 230 with a support 231 is provided with a bench having a seat 232, a front support 233, a rear support 234 and a back 234'. The seat, front support, back support and floor upon which they rest form a tunnel in which can be positioned two video receivers 235 and 236. A coin control 237 for receiver 235 is located on the wall 238 at the end of bench seat 232. Through an opening 239 at the end of front support 233 images from receiver 235 are projected onto mirror 240 and reflected upwardly through opening 241 in table top 230 to a mirror 242 supported on an upright 243 on the table top 230 and the wall 238. The upward passage of the rays of light may be boxed in and terminate in a viewing screen facing the seat 232, though not so shown. If it is desired to project to a large screen a horizontal Schmidt reflector and lens may be utilized in a manner well known in the art in conjunction with a mirror. An opening 244 in the seat 232 adjacent the wall 238 facilitates manipulation of the video controls not shown for receiver 235 by a person occupying seat 232 and viewing the video scenes on mirror 242. Audio reproduction from receiver 235 passes laterally into tube 245 upwardly in tube 246 and again laterally through passage 247 to emerge as sound adjacent an ear of a person occupying seat 232 over receiver 235. Receiver 236 supported in a frame on wheels 248 is adapted to movement in and out of the tunnel beneath seat 232. Normally the receiver 236 is stored under the seat 232. As shown it is withdrawn to clarify the showing of entrance 252. It has a coin control 249, a viewing area 250, and a sound exit 251. Exit 251 cooperates with entrance 252 to an upstanding tube 253 supported on back member 234'. Sound emerges from tube 253 through an opening 254 adjacent an ear of a person occupying seat 232 over receiver 236 while viewing screen 250 is visible to such person. From the position shown in Fig. 3, receiver 236 may be moved into the tunnel to bring the sound exit 251 into register with opening 252. The screen 250 then should be in an exposed position adjacent the end of seat 232 and conveniently available for a person on the end of the seat. By turning slightly and resting an arm on the table the person's ear would be adjacent the sound opening 254 and direct vision of screen 250 would be obtained. While ear phones may be substituted for the sound conveying system outlined, they require adjustment on the person listening, involve contact with many persons, hence from point of convenience and sanitation are less desirable. Also keys may be substituted in the control means for coins.

While the examples set forth in detail in Figs. 2 and 3 have been described as applications of the invention to eating and refreshment places, these embodiments have their uses under other circumstances and surroundings. In laboratory and class room instruction where tables are required to support items requiring manual manipulation, or where a machine, a work of art, or other subject of study is desirable at close range, the invention lends itself to providing individual pictorial and audible information either of primary importance or secondary to the matter in hand.

It is obvious that the display 226 of Fig. 1 may be fitted into space 241 of Fig. 3, and the image may be viewed by a downward glance to 241 or a forward glance to 242.

In the operation of the various television and radio receivers, it is intended that timing means not shown shall be included with the key or coin control means, so that a definite period of operation of the receivers shall occur following release to operation. The volume of sound emanating from the sound director is so regulated that it will not carry to a distance that would cause dissonance with an emanation from another director. The provision of the director alongside a person seated for comfort removes the necessity for adjustment of a head receiver on the person's body and the inconvenience and annoyance attendant upon such adjustment upon initiation of and termination of a program. The person desiring the program has only to sidle up to the sound director and to cast his eyes upon the suitably disposed image display associated with the receiver to obtain the television program to the exclusion of others.

The various mechanical arrangements presented and their description are by way of illustration only and it will be understood that other mechanical arrangements and devices may be employed to effect the modes of operation and the results described. Other arrangements, modifications, and variations will occur to those skilled in the art to which this invention is related. Accordingly, my invention should be understood as not restricted to the specific embodiments illustrated and described but as including all embodiments coming within the scope of the following claims.

I claim:

1. In combination, a seat with accessible space thereunder, a television and sound receiver mounted for lateral movement into and out of said space; an image screen mounted with said receiver and uncovered by said out movement for viewing from said seat; and an acoustical system including a terminal at said seat for activation of said acoustical system, said television and sound receiver having means for activating said acoustical system at said terminal, said activating means being so disposed on said receiver that when the latter is moved to uncover said image screen said activating means activates said acoustical system through said terminal.

2. In combination, a television and sound receiver, a separately mounted image screen, a mounting for said receiver accommodating manually provided lateral movement of same relative to said screen, operating make and break systems between said members, an optical system connecting said receiver and said screen including a make and break connection operated by said lateral movement, a seat with accessible space thereunder positioned for viewing said screen and in close proximity thereto; and an associated acoustical system connected to said sound receiver by said lateral movement, said optical system, acoustical system and receiver being arranged so that a single person can view and hear a desired program when said receiver is positioned in said space.

3. In combination, a seat with accessible space thereunder; an optical system, including an image showing member, for operative connection with a television receiver in said accessible space; an acoustical system, including sound directing means, for operative connection to a sound receiver in said space, said acoustical system and said optical system having terminals at said seat for activation of said systems; a combined television and sound receiver, said television and sound receiver having means for activating said acoustical and optical systems at said terminals; a mounting for said television and sound receiver for its movement into said accessible space and so into said operative relationship with said optical and acoustical systems; said optical system, acoustical system and receiver being so arranged that a single person can view and hear a desired program.

4. In combination with a seat having accessible space thereunder, an optical system for television reception including an image showing member for viewing from said seat and a make and break connection for said system with a television receiver in said space; an acoustical system for sound accompanying said television images including a sound conveying member adjacent said seat and a connection for said system to a sound receiver in said space; a television and sound receiver; a mounting for said optical system, acoustical system and receiver for their joint movement laterally into said accessible space and into operating connection with said systems; said members being so organized that a single person can view and hear a desired program from said seat.

5. In combination, a seat with accessible space thereunder; an optical system for operative connection with a television receiver in said accessible space, said system including an image showing member, support means for the latter including a table top; an opening in the table top for passage of modulated light to said showing member; an acoustical system for operative connection to a sound receiver in said space, said system including means directing sound to said seat; a television and sound receiver; a mounting for said television and sound receiver for their joint movement into said accessible space and so into said operative relationship with said optical and acoustical systems; a second seat adjacent said image showing member and said sound directing means; said optical system, acoustical system and receiver being so arranged that a single person on said first seat can view and hear a desired program and a single person on said second seat can view the program provided thereon.

6. In combination, a seat with accessible space thereunder; an optical system for operative connection with a television receiver in said accessible space; said system including an image showing member, support means for the latter including a table top, an opening in the table top for passage of modulated light to said showing member, said opening being closed by said showing member; an acoustical system for operative connection to a sound receiver in said space, said system including sound directing means exteriorly of said space; a television and sound receiver; a mounting for said television and sound receiver for their joint movement into said accessible space and so into said operative relationship with said optical and acoustical systems; said optical system, acoustical system and receiver being so arranged that a single person can view and hear a desired program when occupying said seat.

7. In combination, a first seat having accessible space thereunder, a first optical system, including an image showing member, arranged for cooperative action with a television receiver when the latter is positioned in said accessible space; a first acoustical system, including sound directing means, arranged for cooperative action with a sound receiver when the latter is positioned in said accessible space; a second seat having accessible space thereunder, a second optical system, including an image showing member arranged for cooperative action with a television receiver when the latter is positioned in said accessible space; a second acoustical system, including sound directing means exteriorly of said space arranged for cooperative action with a sound receiver when the latter is positioned under said seat; a television and sound receiver; a mounting for said television and sound receiver for their joint movement into said accessible spaces and into operating connection with said optical and acoustical systems, said seats for transfer of said mounting and receiver from one to the other of said seats; said optical system, acoustical system and receiver being so arranged that a single person can view and hear a desired program through said receiver at either of said seats in accordance with the positioning of the receiver.

8. A casing movably supported on a floor, an optical system, an acoustical system, openings in said case for passage from therein of light to the optical system and sound to said acoustic system, supporting means for said systems positioning them relative to a seat so that a person on said seat may simultaneously receive the output of said systems, combined television and sound receiving means in said casing for providing light and sound to said respective systems through said apertures, when said case is under said seat, and make and break connections between said television receiver and optical system and between said sound receiver and said acoustic system, both connections being operated simultaneously by manual movement of said case into and out of the space under said seat whereby service of pictures and sound to the person on said seat is initiated and terminated.

9. An optical system and an acoustic system, support means for said systems tied together by a seat cross member, a casing movably supported on a floor and movable into and out of the space under said seat, apertures in said casing for communicating from therein light to said optical system and sound to the acoustic system; a combined television and sound receiver in said casing for providing light images and accompanying sound to said respective systems through said apertures, and make and break connections between said casing and said systems operable simultaneously manually by movement of the casing into and out of the before mentioned space for initiating and terminating picture and sound service to the person on said seat.

10. In combination with an optical system including a viewing screen and an acoustic system having a listening terminal, an optical channel leading to said screen, a sound channel leading to said listening terminal, supporting means for said systems positioning them relative to a seat so that a person on said seat may simultaneously receive the output of said systems, receiving televised images from said screen and sound related to the images from the listening terminal, a casing supported for movement laterally into and out of the space under said seat, areas in the sides of said casing arranged for passage from therein of light to said optical system and sound to said acoustic system; combined television and sound receiving means in said case for providing light and sound to said systems; and make and break connections between said case and said systems operated by manual movement laterally of said casing, initiating simultaneous sound and picture service when movement is in one direction, terminating this service when the movement is in the reverse direction.

11. In combination, an optical system having a viewing screen and an acoustic system having a listening terminal, an optical channel leading to said viewing terminal, supporting means for said systems positioning them relative to a seat so that a person on said seat may simultaneously receive the output of said systems, receiving images from the viewing screen and synchronized sound from the listening terminal; a casing supported for lateral movement into and out of the space under said seat, areas in the sides of said casing arranged for passage from therein of light to said optical system and sound to said acoustic system, means within said casing for providing light images through one of said areas to said optical system; means within said casing for providing through the other of said areas sound to said acoustic system; and make and break connections between said casing and said systems, including said areas, operated by manual movement laterally of said casing, initiating sound and picture service when said movement is in one direction, terminating said service when the movement is in the reverse direction.

12. A casing supported movably on a floor, a first optical system, a first acoustic system, supporting means for said systems, positioning them relative to a first seat so that a person on said seat may receive the output of said systems simultaneously, a second optical system, a second acoustic system, supporting means for said second systems for positioning them relative to a second seat so that a person on said second seat may receive the output of said second systems simultaneously, an open shuttle path between said first support means and said second support means, said casing being mounted for shuttling back and forth under manual power between said first and second supporting means and under said respective seats, areas in the sides of said casing arranged for passage from therein of light for said optical systems and sound for said acoustic systems, make and break connections between said casing and said systems including said areas, operative between the casing and the respective first optical and acoustic systems when the casing is under the first seat, and operative between the casing and the respective second optical and acoustic systems when the casing is under the second seat, the break operation providing the initial step in the shuttle movement.

References Cited in the file of this patent

UNITED STATES PATENTS

| | | |
|---|---|---|
| 1,189,490 | Sanders | July 4, 1916 |
| 1,952,514 | Selby | Mar. 27, 1934 |
| 2,045,180 | Douthwaite | June 23, 1936 |
| 2,208,068 | Blaski | July 16, 1940 |
| 2,241,586 | Dorsman | May 13, 1941 |
| 2,438,256 | Stein | Mar. 23, 1948 |
| 2,570,821 | Kornberg et al. | Oct. 9, 1951 |

OTHER REFERENCES

Theater Television Today, Journal of the S. M. P. E., vol. 53, pages 321–349, Oct. 1949.